July 11, 1933. M. W. McARDLE 1,918,051
WAFFLE GRIDDLE
Filed Sept. 3, 1930 2 Sheets-Sheet 1
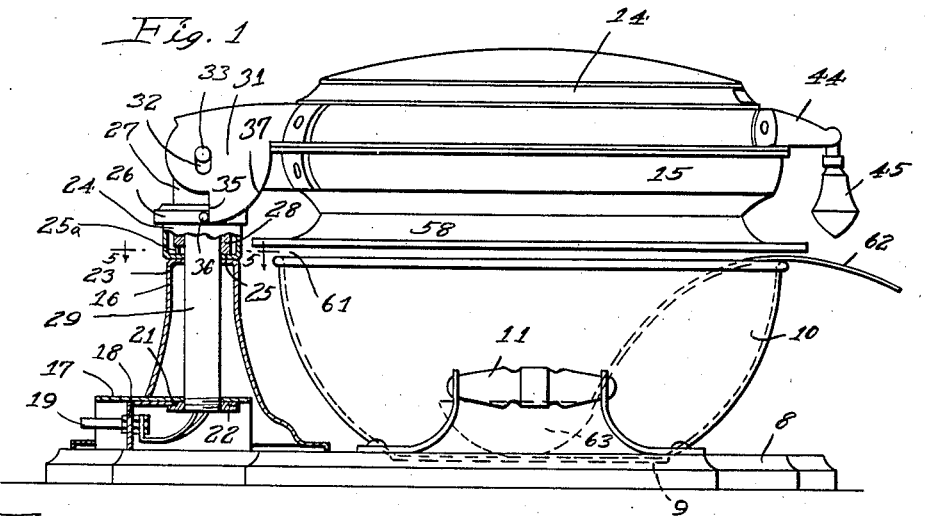
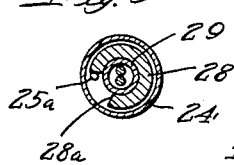
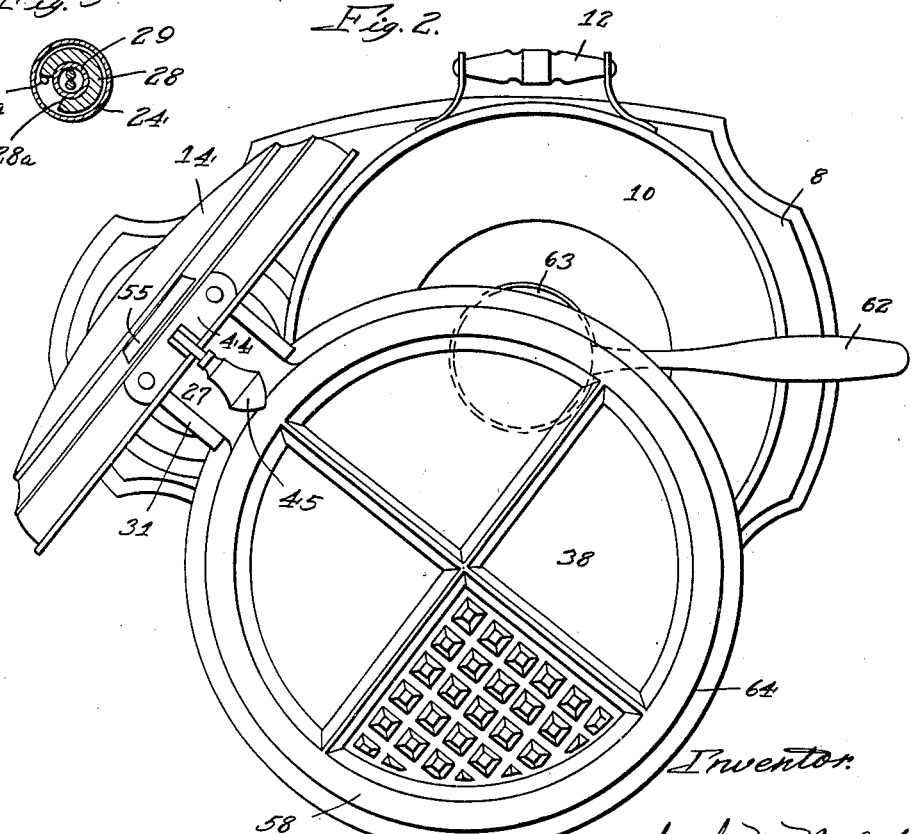
Inventor:
Michael W. McArdle
By Wilson, Dowell, McCanna & Rehm
Attys.

July 11, 1933.  M. W. McARDLE  1,918,051
WAFFLE GRIDDLE
Filed Sept. 3, 1930    2 Sheets-Sheet 2

Patented July 11, 1933

1,918,051

UNITED STATES PATENT OFFICE

MICHAEL W. McARDLE, OF CHICAGO, ILLINOIS

WAFFLE GRIDDLE

Application filed September 3, 1930. Serial No. 479,438.

This invention relates to griddles, and has particular reference to a combined waffle griddle and batter container wherein the griddle serves to cover the container and conceal the interior thereof.

It is many times convenient to cook waffles, griddle cakes and the like upon the dining table during the progress of the meal, because of the desirability of serving the food immediately upon its removal from the griddle. It has been customary in the past to employ the conventional type of electrically heated griddle, the batter being held in a suitable type of pitcher or the like, from which it is poured onto the cooking elements. This is an unsightly arrangement and one in which it is difficult to measure the exact quantity of batter required.

I have aimed to provide a unitary assembly comprising at least one cooking element, a batter container, a base for supporting the container, and means for supporting the cooking element over the container in a position to cover the top thereof.

Another object of the invention is the provision of a waffle griddle having a container for holding batter wherein the interior of the container is normally concealed.

A further object of the invention is the provision of a waffle griddle having a container for holding batter, wherein the cooking elements normally serve to conceal the interior of the container, but which may be readily moved to expose a portion of the container to permit batter to be transferred therefrom to the cooking elements.

Another object of the invention is the provision of thermostatic means for indicating when the cooking elements have reached an operating temperature.

A still further object of the invention is the provision of the griddle having means for preventing rotation of the cooking elements when occupying their closed position.

Another object of the invention is the provision of a griddle having a container for batter, and means for automatically positioning the cooking elements over the container to conceal the interior thereof.

I have further aimed to provide a griddle having a batter container and combined means for concealing the interior of the container and catching the drip from the cooking elements.

Other objects and attendant advantages will become apparent to those skilled in the art from the following description and the accompanying drawings, in which—

Figure 1 is a side elevation partly in section showing my improved waffle griddle;

Fig. 2 is a top view of the griddle showing the upper cooking element in its open position and the cooking elements rotated to partially uncover the bowl;

Fig. 5 is a section on the line 5—5 of Figure 1.

The invention contemplates the provision of a waffle griddle having a base and a batter container or bowl resting upon the base and readily removable therefrom. A standard, suitably positioned upon the base, serves to support the upper and lower cooking elements over the container. The cooking elements are arranged to rotate about a vertical axis between a position over the container and a position partially uncovering the container, the latter position being such that batter may be transferred from the container to the cooking elements. The upper cooking element is pivotally supported on the lower cooking element to rotate about a horizontal axis between an open and a closed position. Means are provided to prevent the cooking elements from being rotated when the upper element is in its closed position and for rapidly and accurately positioning the elements in their operative position over the container.

Figure 3:
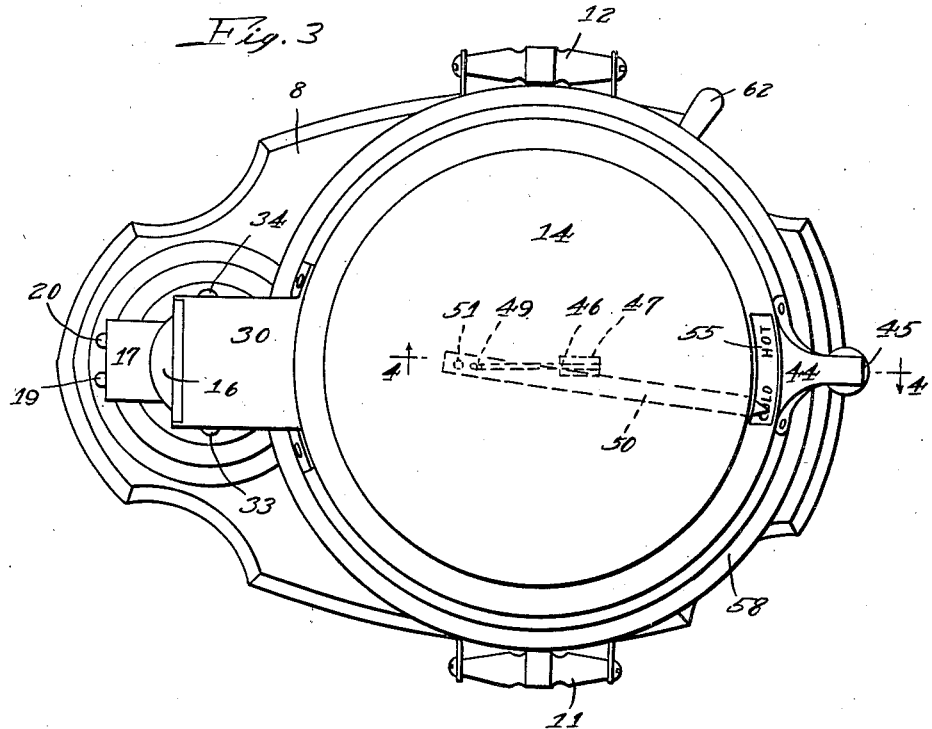
Fig. 3 is a top view of the griddle in its closed position showing the thermostat indicator in dotted lines.

Referring now to the drawings, the numeral 8 designates generally a base of suitable size and shape characteristics which may advantageously be provided with a central depression 9 adapted to receive a bowl or container 10. Handles 11 and 12 may be secured to the base 8 on either side, as shown in Fig. 3, if desired, to permit the griddle to be easily transferred from place to place. The bowl 10 may be of any suitable shape characteristic, the depression 9 serving to accurately position the bowl on the base 8 and prevent it from being accidentally moved about on the base.

A pair of cooking elements or grids, designated generally by the numerals 14 and 15, are supported over the bowl 10 upon a standard designated generally by the numeral 16. The standard may be provided with suitable shape characteristics and ornamentation and is secured to the base 8 in any suitable manner, as for instance, by spot welding or the like. A socket 17 is positioned in the standard 16 near the lower end thereof to receive a conventional electric fitting or plug. A metal strip 18 within the socket 17 serves to support the electrical terminals 19 and 20, as shown in Figure 1, and projects along the wall of the socket 17 as shown at 21 to reinforce the socket and provide a bearing for a flange 22, presently to be more fully described. The upper end of the standard 16 is crimped inwardly, as shown at 23, and serves to support a cap 24 having a lower rim 25 and an upper shoulder 26. The lower rim 25 of the cap 24 rests upon and is fixedly secured to the portion 23 of the standard 16 and has an upwardly extending pin 25—a positioned therein. A right angled supporting arm 27 has one leg thereof fixedly secured to the lower cooking element 15, the lower end 28 of the other leg thereof resting against the rim 25 and being supported thereby. A slot 28—a is provided in the lower edge of the leg 28 to receive the pin 25—a, the slot being so positioned and of such length as to suitably limit the horizontal movement of the cooking elements. A tube 29 is fixedly secured in the supporting arm 27 and projects downwardly through the standard 16 and through the upper wall of the socket 17. The flange 22 is threaded on the lower end of the tube 29 and has sliding contact against the portion 21 and the upper wall of the socket 17, as shown in Figure 1.

A hinge member, including an upper portion 30 and spaced side ears 31, serves to support the upper cooking element 14 upon the arm 27 to move between a closed position, as shown in Figure 1 and an open position as shown in Fig. 2. The spaced ears 31 have oblong openings 32 to receive hinge pins 33 and 34 projecting from opposite sides of the member 27. Stops 35 are provided on the spaced ears 31 to bear against pins 36 on opposite sides of the upper shoulder 26. The spaced ears 31, the shoulders 35 and the pins 36 serve to accurately position the cooking elements over the bowl 10 and prevent rotation thereof while the upper element 14 is in its closed position. Thus, while the upper cooking element 14 occupies the closed position, as shown in Figure 1, the shoulders 35 bear against the pins 36. However, when the upper cooking element is moved to its open position as shown in Fig. 2, the shoulders 35 are raised out of engagement with the pins 36 and the upper and lower cooking elements may be rotated as a unit with respect to the bowl. When it is desired to rotate the elements back to a position over the bowl 10, the upper element 14 may be immediately lowered to its closed position and the two elements rotated. Under these circumstances, the pins 36 engage the arcuate edges 37 of the ears 31, raising the hinge portion as the elements move into their closed position, while the oblong openings 32 move upward on the pins 33 and 34. When the elements reach their closed position, the ears 31 will slide off the pins 36 lowering the hinge member and the cooking element 14, at which point the shoulders 35 will again bear against the pins 36.

The upper and lower heating elements 14 and 15 are provided with facing members 38 and 39 arranged to be heated by electrical heating elements 40 and 41, respectively, in a well known manner. The upper heating element 14 is provided with an enclosing cover 42 and the lower element with an enclosing cover 43 secured to the facing members 38 and 39 in any well known manner. The upper cooking element 42 is provided with an arm 44 on the forward side thereof adapted to pivotally support a handle 45 for raising and lowering the upper cooking element 14 and for swinging the cooking elements in a horizontal plane.

Thermostatic means are provided for indicating when the cooking elements have reached a suitable operating temperature. A bimetallic element, indicated generally by the numeral 46, is secured to a lug 47 on the upper side of the facing member 39 by means of screws 48 and is provided at its free end with an upstanding pin 49. Changes in the temperature of the cooking element 14 will cause the bi-metallic element 46 to be warped back and forth in a plane at right angles to Fig. 4. A pointer 50 is pivotally supported at one end upon a pin 51 which passes through a loop 52 formed on the end of the pointer. A cotter pin 53 serves to maintain the pointer on the pin 51. The pointer 50 is provided with an opening 54 through which the pin 49 passes. Thus, as the bimetallic element 46 moves in a plane at right angles to Fig. 4, the pointer 50 is rotated about the pin 51 at right angles to this figure. Viewing Fig. 3, the bi-metallic element 46 is arranged to move upward with increasing temperature of the cooking element 14 and downward with decreasing temperature, thus moving the point 50 upward when the cooking element is heated, and downward when the cooking element cools. In order that the pointer 50 may be observed and its position noted, a mica window 55 is positioned in the casing 42 of the upper cooking element and a backing plate 56 is placed therebehind upon the facing member 39 to conceal the interior of the cooking element and to present the legend "Hot" and "Cold", as shown in Fig. 3. The end of the pointer 50 projects across the face of the backing plate 56 so as to be visible through the window 55, against the plate 56.

Figure 4:
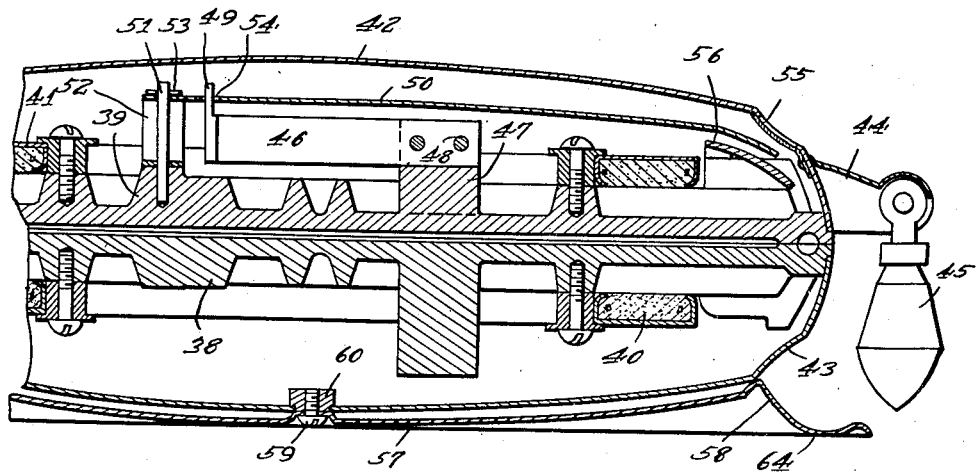
Fig. 4 is a fragmentary section on the line 4—4 of Fig. 3.

A plate 57 providing a concealing rim 58 is secured to the bottom of the cover 43 of the lower cooking element 15 by means of a screw 59 and nut 60, shown in Fig. 4. The rim 58 projects downward and outward a sufficient distance to completely cover the top of the bowl 10 when the cooking elements occupy their normal operative position. In this manner the rim serves to conceal the interior of the bowl. The rim is, however, spaced from the top of the bowl as shown at 61 in Figure 1, whereby to permit the handle 62 of a spoon 63 to pass therebetween without interfering with the pivotal movement of the cooking elements. A depression 64 is formed in the rim 58 directly beneath the periphery of the cooking elements 14 and 15, and serves to receive the drip of batter from between the facing members 38 and 39. This drip normally occurs either because of an excessive amount of batter between the facing members or because of the excessive expansion of the batter placed therebetween. It will thus be seen that the rim 58 serves to conceal the interior of the bowl 10 and to receive the material which drops from between the facing members.

In operating the device, the batter will normally be prepared in the bowl 10 which may readily be removed from the base 8 for that purpose. The terminal points 19 and 20 are connected to a suitable source of electrical energy, and the cooking elements permitted to heat until the pointer 50 indicates that they have reached their operative temperature. The handle 45 will then be grasped by the operator raising the upper cooking element until the shoulders 35 are disengaged from the pins 36, when horizontal pressure on the handle 45 will cause the cooking elements 14 and 15 to move to the position shown in Fig. 2. In this position, the spoon 63 may be raised from the bowl 10 with a supply of batter which is deposited onto the facing member 38 of the lower cooking element, the spoon 63 having exactly the capacity required to form a single waffle. The handle 45 is then again grasped to rotate the cooking elements back to a position over the bowl 10 and lower the upper cooking element 14 onto the lower cooking element 15, where it is allowed to remain until the waffle is suitably cooked.

The advantages of my improved construction will be readily apparent. The bowl and spoon may be easily and quickly removed from the base for making up the original batter or for cleaning the device after use. Means are provided directly beneath the cooking elements for catching the drop of batter from the cooking operations. This means also serves to conceal the interior of the container from view at all times excepting only that period during which the cooking elements are being charged. Means are provided for preventing the cooking elements from being rotated horizontally to a point at which the equilibrium of the waffle griddle might be disturbed. Means are also provided for accurately and quickly locating the cooking elements in their operative position over the bowl and for preventing rotation thereof during the cooking operations.

While I have thus described and illustrated a specific embodiment of my invention, I am aware that numerous alterations and changes may be made therein without materially departing from the spirit of the invention, and I do not wish to be limited except as required by the prior art and the scope of the appended claims.

I claim:

1. In a griddle, a base having a bowl supporting portion, upper and lower grids, an open top batter bowl on said bowl supporting portion for holding a quantity of batter to be used upon said lower grid, and pivoted means for supporting said grids on said base for rotation as a unit on a vertical axis between a position normally closing said bowl and an open position to uncover the latter for the transfer of batter therefrom to said lower grid and for rotation of said upper grid on a horizontal axis to separate said grids for the introduction of batter therebetween.

2. In a griddle adapted to rest upon a table, a base having a bowl supporting portion and a grid supporting portion, a batter bowl removably positioned on said bowl supporting portion, at least one grid on said grid supporting portion arranged to overhang said bowl and normally close the same and means for pivotally supporting said grid for rotation in a horizontal plane to uncover said bowl for the transfer of batter therefrom to said element, and means for transferring batter from said bowl to said cooking element.

3. In a waffle griddle adapted to rest upon a table, a base, a container for batter having an open top removably positioned on said base, an upper and a lower cooking element supported over said container in close proximity thereto, combined means on said lower element for concealing the interior of said container and catching the drip from said element, and means for uncovering at least a portion of said container to permit batter to be transferred therefrom to said lower cooking element.

4. In a waffle griddle adapted to rest upon a table, a base, a container for batter removably positioned on said base having an open top, an upper and a lower cooking element supported over said container in close proximity thereto, combined means on said lower element for concealing the interior of said container and catching the drip from said element, and means for pivotally supporting said cooking elements to move in a plane parallel to said base to uncover at least a portion of said container and permit batter to be transferred therefrom to said lower cooking element.

5. In a waffle griddle adapted to rest upon a table, a base, a container for batter removably positioned on said base having an open top, an upper and a lower cooking element supported over said container in close proximity thereto, combined means on said lower element for concealing the interior of said container and catching the drip from said element, means for pivotally supporting said cooking elements to move in a plane parallel to said base, and means for limiting the movement of said elements between a position over said container and a position at which a portion of said container is uncovered to permit batter to be transferred therefrom to said lower cooking element.

6. In a waffle griddle adapted to rest upon a table, a base, a container for batter on said base having an open top, an upper and a lower cooking element supported over said container in close proximity thereto, means for pivotally supporting said upper cooking element upon said lower element to move between an open and a closed position, means for pivotally supporting said cooking elements to move in a plane parallel to said base to uncover at least a portion of said container, and permit batter to be transferred therefrom to said lower cooking element, and means for preventing movement of said cooking elements when said upper element occupies its closed position.

7. In a waffle griddle adapted to rest upon a table, a base, a container for batter on said base having an open top, an upper and a lower cooking element supported over said container in close proximity thereto, combined means on said lower element for concealing the interior of said container and for catching the drip from said elements, means for pivotally supporting said upper cooking element upon said lower element to move between an open and a closed position, means for pivotally supporting said cooking elements to move in a plane parallel to said base to uncover at least a portion of said container and permit batter to be transferred therefrom to said lower cooking element, and means for preventing movement of said cooking element when said upper element occupies its closed position.

8. An electric griddle comprising a base having a bowl supporting portion and an upright grid supporting portion, an open top batter bowl on said bowl supporting portion, upper and lower grids overhanging said base, a pivot piece rotatable in said upright portion arranged to support said lower grid intermediate its ends and said upper grid at its upper end for horizontal rotation as a unit between a position normally closing said bowl and an open position for the removal of batter from the bowl, said upper grid also being rotatable on a horizontal axis to separate said grids for the transfer of batter to said lower grid.

9. An electric griddle comprising a base having a bowl supporting portion and an upright grid supporting portion, an open top batter bowl on said bowl supporting portion, upper and lower grids pivoted to said upright portion to rotate as a unit on a vertical axis between a position normally closing said bowl and an open position, said upper grid being independently rotatable on a horizontal axis between a closed position on said lower grid and an open position for the transfer of a batter from the batter bowl to the lower grid, and means operative between said upper grid and said upright portion for locating said grids in the closed position over said bowl.

10. An electric griddle comprising a base having a bowl supporting portion and an upright grid supporting portion, an open top batter bowl on said bowl supporting portion, upper and lower grids pivoted to said upright portion to rotate as a unit on a vertical axis between a position normally closing said bowl and an open position, said upper grid being independently rotatable on a horizontal axis between a closed position on said lower grid and an open position for the transfer of a batter from the batter bowl to the lower grid, and cam means operative between said upper grid and said upright portion for locating said grids in the closed position over said bowl, said means comprising at least one cam on one of said members and at least one cam follower on the other member arranged to prevent horizontal rotation of said grids when said upper grid occupies its closed position.

11. An electric griddle comprising a base having a bowl supporting portion and an upright grid supporting portion, an open top batter bowl on said bowl supporting portion, upper and lower grids pivoted to said upright portion to rotate as a unit on a vertical axis between a position normally closing said bowl and an open position, said upper grid being independently rotatable on a horizontal axis between a closed position on said lower grid and an open position for the transfer of batter from the batter bowl to the lower grid, and cam means operative between said upper grid and said upright portion for locating said grids in the closed position over said bowl, said means comprising at least one cam on one of said members and at least one cam follower on the other member arranged to prevent horizontal rotation of said grids when said upper grid occupies its closed position, said upper grid having lateral movement in its support to compensate for eccentric movement between the cam and cam follower.

12. An electric griddle comprising a base having a bowl supporting portion and an upright grid supporting portion, an open top batter bowl on said bowl supporting portion, upper and lower grids pivoted to said upright portion to rotate as a unit on a vertical axis between a position normally closing said bowl and an open position, said upper grid being independently rotatable on a horizontal axis between a closed position on said lower grid and an open position for the transfer of a batter from the batter bowl to the lower grid, and cam means operative between said upper grid and said upright portion for locating said grids in the closed position over said bowl, said means comprising depending cam elements on said upper grid, and fixed cam followers on said upright, said cams having cam surfaces for engaging said followers when said grids occupy their closed position on the vertical axis and said upper grid occupies a closed position on its horizontal axis, whereby said grids are located in their closed position over said bowl and rotation thereof is prevented until said upper grid is rotated out of its closed position.

MICHAEL W. McARDLE.